(12) United States Patent
Sugai et al.

(10) Patent No.: US 7,308,560 B2
(45) Date of Patent: Dec. 11, 2007

(54) PROCESSING UNIT

(75) Inventors: Danya Sugai, Tokyo (JP); Teruaki Uehara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 131 days.

(21) Appl. No.: 11/048,759

(22) Filed: Feb. 3, 2005

(65) Prior Publication Data

US 2005/0251658 A1 Nov. 10, 2005

(30) Foreign Application Priority Data

Apr. 19, 2004 (JP) ............................. 2004-122678

(51) Int. Cl.
G06F 15/17 (2006.01)
G06F 15/76 (2006.01)
G06F 9/30 (2006.01)

(52) U.S. Cl. ..................... 712/36; 712/221; 712/225

(58) Field of Classification Search ............ 712/36, 712/221, 225
See application file for complete search history.

(56) References Cited

U.S. PATENT DOCUMENTS 5,640,578 A * 6/1997 Balmer et al. ............. 712/221
5,742,841 A * 4/1998 DeRoo et al. .............. 712/43
6,078,941 A * 6/2000 Jiang et al. ................ 708/625
6,965,981 B2 * 11/2005 Nishioka et al. ........... 712/22

FOREIGN PATENT DOCUMENTS

JP 5-035774 2/1993
JP 2000-293357 10/2000

* cited by examiner

Primary Examiner—Daniel H. Pan
(74) Attorney, Agent, or Firm—Nixon Peabody LLP; Donald R. Studebaker

(57) ABSTRACT

A digital signal processing unit includes a control unit and a data computing unit. An R/L register for distinguishing independent data is disposed in the control unit. An R/L select signal for indicating independent data is supplied to the data computing unit. A data processing instruction signal for distinguishing a data processing instruction from other instructions is issued from an instruction decoder. The R/L register for distinguishing independent data is controlled by the data processing instruction signal. In the data computing unit, the portion related to storing independent data is multiplexed according to the number of independent data to be processed, and this multiplexed portion is controlled by the R/L select signal supplied from the control unit.

15 Claims, 4 Drawing Sheets

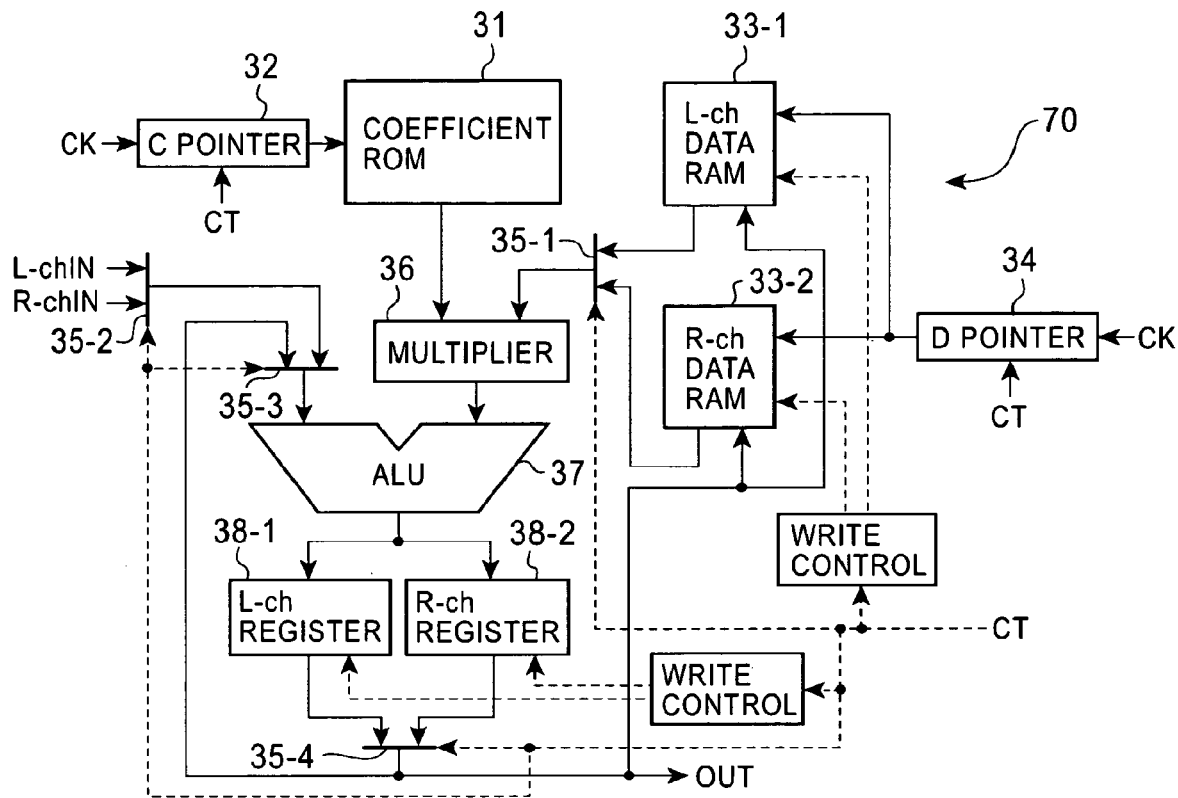
FIG. 1(1) DATA COMPUTING UNIT 30
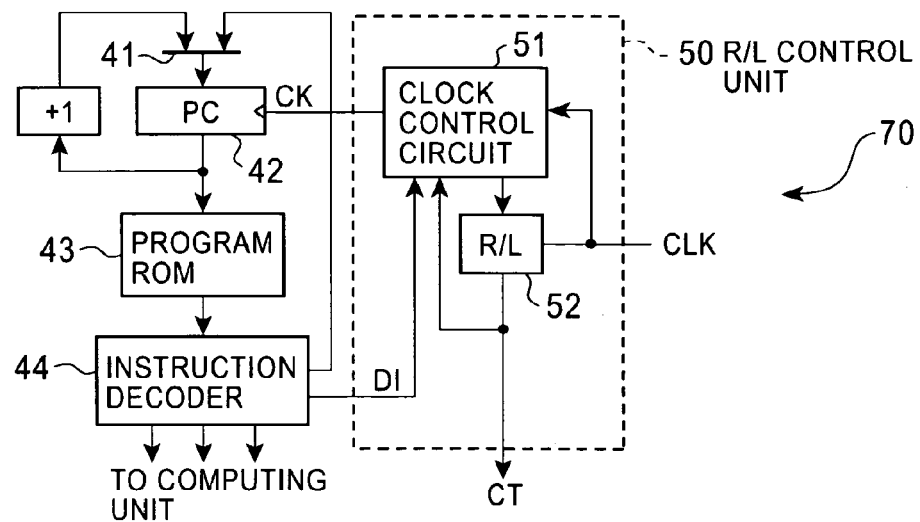
FIG. 1(2) CONTROL UNIT 40

FIG. 4(1)   DATA COMPUTING UNIT 10
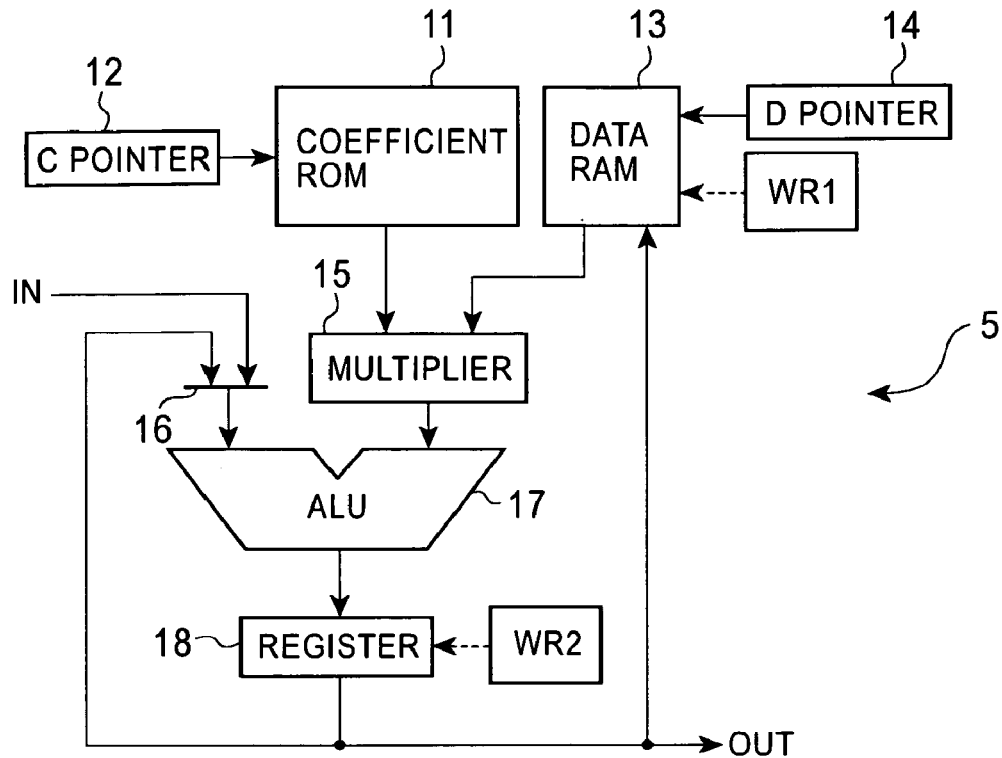
FIG. 4(2)   CONTROL UNIT 20
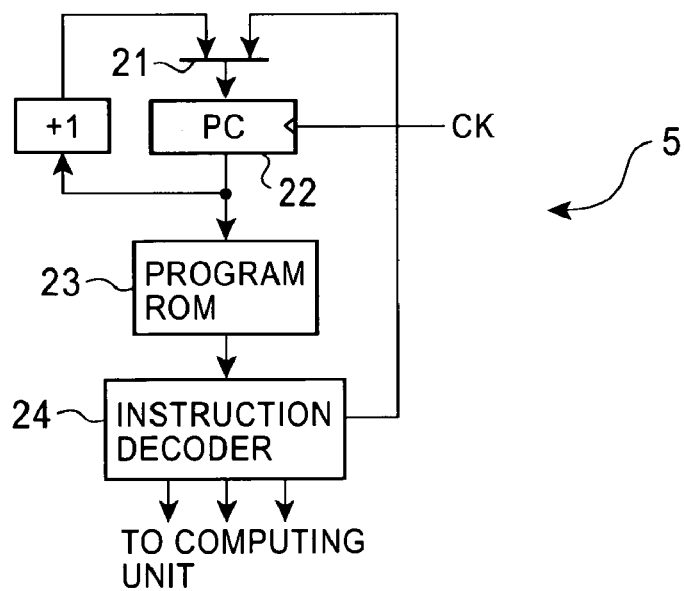

PROCESSING UNIT

BACKGROUND OF THE INVENTION

1. Field of the Invention

The present invention relates to a processing unit, such as a digital signal processor (hereafter called "DSP"), which can perform a same computing processing for a plurality of independent identical data by a common program with relatively small power consumption, when the processing unit is used in stereo-voice processing, for example.

2. Description of the Related Art

Advanced digital processing often includes digital processing of voice data and image data. Various processing units have been proposed to execute product sum computation that is frequently used for the digital processing of voice data and image data at high speed. One of such processing units is, for example, a DSP disclosed in Japanese Patent Kokai (Laid-Open Application) No. H5-35774 and Japanese Patent Kokai (Laid-Open Application) No. 2000-293357. This DSP includes a data computing unit for executing computing processing, such as product sum computation, and a control unit for generating various control signals to control the data computing unit.

FIG. 4(1) and FIG. 4(2) of the accompanying drawings are block diagrams depicting the above mentioned conventional DSP 5, disclosed in Japanese Patent Applications Kokai No. H5-35774 and No. 2000-293357. FIG. 4(1) shows the data computing unit 10 of the DSP 5, and FIG. 4(2) shows the control unit 20 of the DSP 5.

The data computing unit 10 includes a coefficient read only memory (hereafter called "coefficient ROM") 11 for storing the coefficient data of a product sum computation, and a C pointer 12 for indicating the coefficient data read position in the coefficient ROM 11. The data computing unit 10 also includes a data random access memory (hereafter called "data RAM") 13 of which writing is controlled by the write control signal WR1, for storing the variable data of a product sum computation, and a D pointer 14 for indicating the read position of the variable data in the data RAM 13. The data computing unit 10 also includes a multiplier 15. The multiplier 15 is connected to the output terminal of the coefficient ROM 11 and the output terminal of the data RAM 13. The multiplier 15 is a circuit for performing the multiplication of the coefficient data and the variable data.

The data computing unit 10 also includes a selector 16, an arithmetic and logic unit (hereinafter referred to as "ALU") 17, and a register 18. The first input terminal of the ALU 17 is connected to the output terminal of the multiplier 15. The output terminal of the selector 16 is connected to the second input terminal of the ALU 17. The selector 16 is a circuit for selecting one of the input data IN and the output data OUT. The input terminal of the register 18 is connected to the output terminal of the ALU 17. The register 18, of which writing is controlled by the write control signals WR2, is a circuit for holding the output data of the ALU 17. The output terminal of the register 18 is connected to the input terminal of the data RAM 13 and the input terminal of the selector 16.

The control unit 20 has a selector 21. A program counter (hereafter "PC") 22, a program ROM 23 and an instruction decoder 24 are sequentially connected to the output terminal of the selector 21. The selector 21 is a circuit for selecting either the signals when the output data of the PC 22 is incremented +1 by the control signal provided by the instruction decoder 24, or control signals, such as a jump (JUMP) instruction, provided by the instruction decoder 24. The PC 22 is a circuit for counting based on the clock CK, and generating the address for a reading instruction to the program ROM 23. The program ROM 23 is a memory for storing a program comprised of a plurality of instructions and reading an instruction in the program specified by the address that is supplied from the PC 22. The instruction decoder 24 is a circuit for decoding the instruction read from the program ROM 23, and producing various control signals to execute the instruction (e.g., control signals of the C pointer 12, control signals of the D pointer 14, write control signals WR1 and WR2, output switching signals of the selector 16, control signals of the multiplier 15, control signals of the ALU 17, control signals of the PC 22, control signals of the program ROM 23 and control signals of the JUMP instruction).

In the DSP 5 having such a configuration, the product sum computation of the expression (A), which is frequently used in digital processing, is implemented by the following (1)-(7). Expression (A) is the continuation of expression (B).

$$Y = \Sigma a_i \times x_i \quad \text{(A)}$$

$$C_{i+1} = C_i + (a_i \times x_i) \quad \text{(B)}$$

(1) The coefficient data $a_i$ of the address indicated by the C pointer 12 is supplied from the coefficient ROM 11 to the multiplier 15.

(2) The variable data $x_i$ of the address indicated by the D pointer 14 is supplied from the data RAM 13 to the multiplier 15.

(3) The coefficient data $a_i$ and the variable data $x_i$ are multiplied in the multiplier 15.

(4) The data sent from the register 18 via the selector 16 and the output data of the multiplier 15 are added in the ALU 17.

(5) The output data of the ALU 17 is stored in the register 18.

(6) The value of the C pointer 12 is changed to the address of the next coefficient data.

(7) The value of the D pointer 14 is changed to the address of the next variable data.

These processings (1)-(7) are executed within one cycle. Accordingly, a product sum computation frequently used in digital processing can be executed at high-speed.

The conventional DSP 5, however, has the following problems (a) and (b).

(a) For example, when a same computing processing is performed on two independent data (right channel data R-ch and left channel data L-ch) in stereo-voice processing, generally the right channel data R-ch is processed, and then the left channel data L-ch is processed. In this case, each pointer 12 and 14 operates twice (right channel and left channel processing) respectively, and these unnecessary pointer operations generate unnecessary power consumption. This increases a total power consumption.

(b) For example, if the right channel and the left channel data of stereo-voice data are regarded as monaural data, the program developed for monaural data cannot be used, and a new program must be developed for stereo-voice processing even though the same computing processing is performed for the data. This is inconvenient.

SUMMARY OF THE INVENTION

According to one aspect of the present invention, there is provided an improved data computing unit for use in a processing unit, such as a DSP. The data computing unit (or module) includes a first memory for storing common data to be used in common, and a first pointer for indicating a read position of the common data. The data computing unit also includes N second memories (N is a positive integer) for storing mutually independent data respectively, and a second pointer for indicating a read position of each of the independent data. The data computing unit also includes a first selector for selecting one of the N independent data read from the N second memories, and a multiplier for multiplying the common data read from the first memory and the output data of the first selector. The data computing unit also includes a second selector for selecting one of the N input data, and a third selector for selecting either the output data of the second selector or the computing result. The data computing unit also includes an ALU for performing an arithmetic operation and a logic operation of the output data of the multiplier and the output data of the third selector. The data computing unit also includes N registers for holding the output data of the ALU. The data computing unit also includes a fourth selector for selecting one of the output data of the N registers and supplying the computing result.

Based on a common select signal, the writing of the computing result in the N second memories (i.e., the output of the fourth selector) is controlled, and each select operation of the first, second, third and fourth selectors is controlled.

Since a plurality of memories for storing mutually independent data and a plurality of registers for holding the output data of the ALU are disposed and controlled by common select signal, an unnecessary pointer operation is eliminated when a same computing and processing is performed on the independent data. Therefore, power consumption can be saved. Also the programs developed for monaural data can be directly applied to the programs for stereo data. Therefore, program development cost can be decreased.

According to another aspect of the present invention, there is provided an improved control unit for use in a processing unit such as a DSP. The control unit (or module) includes a PC for counting based on a first clock and generating an address for reading an instruction, and a program memory for storing a program and reading an instruction from a plurality of instructions in the program specified by an address that is issued from the PC. The control unit also includes an instruction decoder for decoding the instruction read from the program memory and generating a control signal for executing the instruction. The instruction decoder also generates the data processing instruction signal for determining whether the instruction is a data computing instruction. The control unit also includes an independent data control unit.

The independent data control unit receives the data processing instruction signal and the second clock, and generates the common select signal for selecting the independent data to be used for computing and processing based on the data processing instruction signal. The independent data control unit also generates the first clock based on the second clock. In response to the data processing instruction signal, the independent data control unit provides the first clock to the PC after the computing cycles, for the number of independent data, are performed if the instruction is a data computing instruction. The independent data control unit provides the first clock immediately to the PC if the instruction is not a data computing instruction.

According to still another aspect of the present invention, there is provided a processing unit, such as a DSP, that includes a data computing unit for performing product sum computation and a control unit for controlling the data computing unit. The data computing unit includes a first memory, first pointer, and N second memories (N is a positive integer). Writing of a computing result into the second memories is controlled by a common select signal. The data computing unit also includes first, second, third and fourth selectors which perform selecting operations based on the common select signal. The data computing unit also includes a multiplier, ALU and N registers. Holding of data in the registers is controlled by the common select signal. The control unit includes a PC, program memory, instruction decoder and independent data control unit.

In the control unit, the PC operates based on the first clock provided by the independent data control unit, and an address for reading an instruction is generated. According to this address, an instruction in the program memory is read and decoded by the instruction decoder, and the control signal for executing an instruction is generated. Also, the data processing instruction signal for determining whether or not the instruction is a data computing instruction is generated and provided to the independent data control unit.

In the independent data control unit, a common select signal for selecting the independent data to be used for computing and processing is generated based on the provided data processing instruction signal, and a first clock is generated based on the second clock that is received. In response to the data processing instruction signal, the independent data control unit supplies the first clock to the PC after the computer processing cycles for the number of independent data are performed if the instruction is a data computing instruction, or supplies the first clock immediately to the PC if the instruction is not a data computing instruction.

In the data computing unit, the common data in the first memory, indicated by the first pointer, is read. The independent data in the second memories, indicated by the second pointer, are read and one of them is selected by the second selector. The output data of the first memory and the output data of the first selector are multiplied by the multiplier. One of the N input data is selected by the second selector, and either the output data of the second selector or the output data of the fourth selector is selected by the third selector. The output data of the multiplier and the output data of the third selector are computed (processed) in the ALU, and the output data of the ALU is held in one of the N registers. One of the output data of the registers is selected by the fourth selector. The output data of the fourth selector is provided to the input of the third selector, and is also written to one of the N second memories, and is then supplied to the outside.

Since a plurality of memories for storing mutually independent data and a plurality of registers for holding the output data of the ALU are disposed and controlled by common select signal, an unnecessary pointer operation is eliminated when a same computing and processing is performed on the independent data. Therefore, power consumption can be saved. Also the programs developed for monaural data can be directly applied to the programs for stereo data. Therefore, program development cost can be decreased.

BRIEF DESCRIPTION OF THE DRAWINGS

FIG. 1(1) and FIG. 1(2) are block diagrams depicting a DSP (digital signal processor) according to Embodiment 1 of the present invention, where FIG. 1(1) illustrates a data computing unit of the DSP and FIG. 1(2) illustrates a control unit of the DSP.

FIG. 4(1) illustrates a data computing unit of a conventional DSP; and

FIG. 4(2) illustrates a control unit of the conventional DSP.

DETAILED DESCRIPTION OF THE INVENTION

Figure 2:
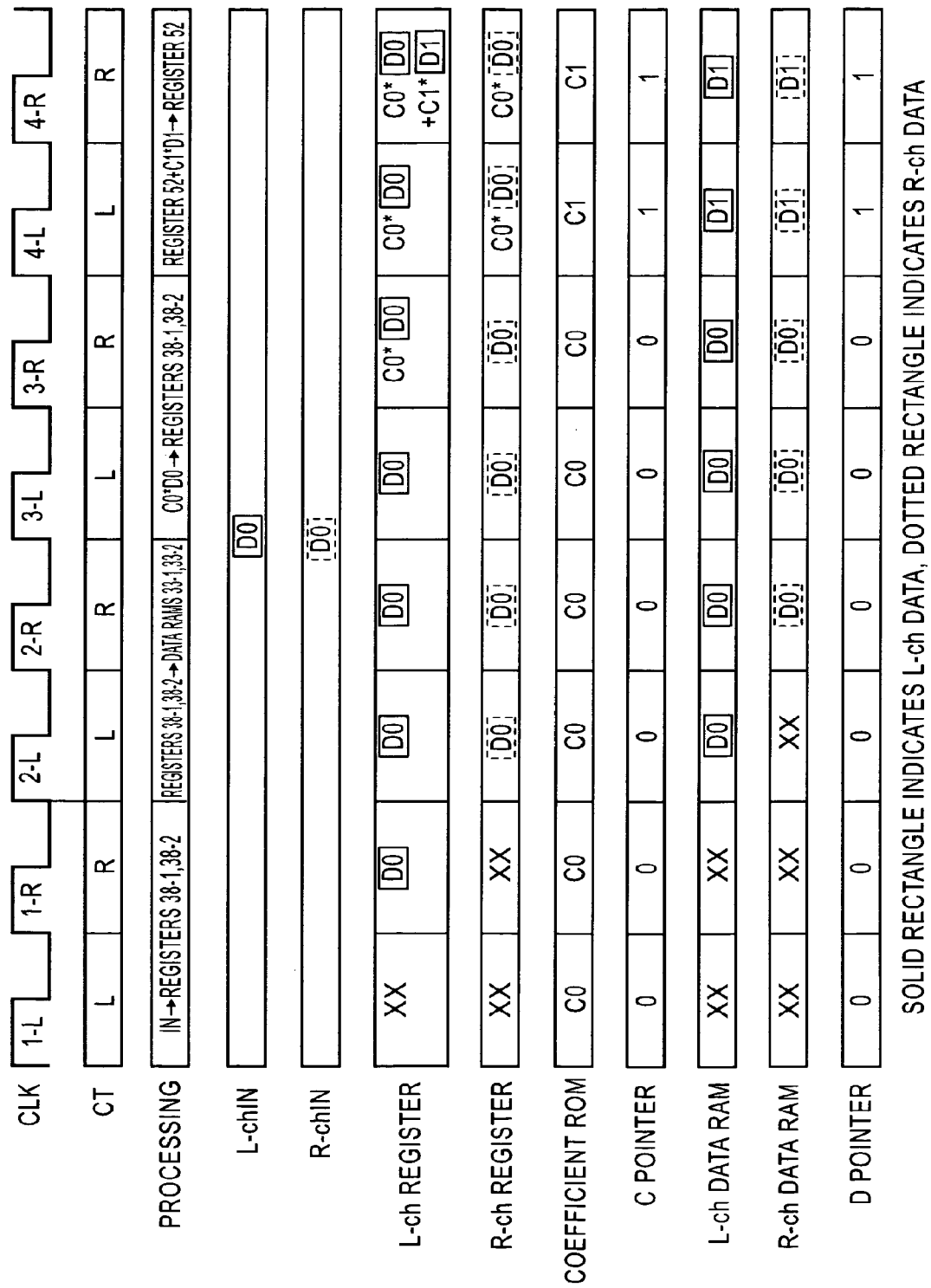
FIG. 2 is a diagram depicting the change of values in the respective components of the DSP shown in FIG. 1.

Referring to FIG. 1(1) and FIG. 1(2), a processing unit (e.g., DSP) 70 according to Embodiment 1 of the present invention will be described. FIG. 1(1) depicts a data computing unit (or module) 30 of the DSP 70 and FIG. 1(2) depicts a control unit (or module) 40 of the DSP 70. This DSP 70 performs a same computing and processing, such as stereo-voice processing, to N (e.g., 2) independent data. The independent date are, for example, right channel data R-ch and left channel data L-ch of stereo-voice data. It should be noted that computing three or more independent data can be implemented based on the same concept.

The DSP 70 of Embodiment 1 includes, the data computing unit 30 for performing such computing and processing as product sum computation, and the control unit 40 for generating various control signals for controlling the data computing unit 30. The data computing unit 30 includes a first memory (e.g., coefficient ROM) 31 for storing common-data (e.g., coefficient data) that is commonly used for product sum computation, a first pointer (e.g., C pointer) 32 for specifying a read position of the coefficient data in the coefficient ROM 31, and two second memories (e.g., left channel data RAM and right channel data RAM) 33-1 and 33-2 for storing N (e.g., 2) independent data to be used for product sum computation respectively. The independent data are, for example, variable data. The data computing unit 30 also includes a single second pointer (D pointer) 34 for indicating a read position of the variable data in the two second memories 33-1 and 33-2. The second pointer 34 is common to the two second memories 33-1 and 33-2.

The C pointer 32 and the D pointer 34 are operated by the first clock CK respectively, and the outputs of the C pointer 32 and the D pointer 34 are enabled only at the end (last cycle) of the computing and processing cycles by the control signal provided from the control unit 40. The computing and processing cycles are repeated for the number of variable data. Another configuration example of the C pointer 32 and the D pointer 34 is that the outputs of the C pointer 32 and the D pointer 34 are masked by a common select signal (e.g., R/L select signal CT) provided from the control unit 40, and enabled only at the end of the computing and processing cycles by the control signal provided from the control unit 40. The computing and processing cycles are repeated for the number of variable data.

The writing of the left channel data RAM 33-1 and the right channel data RAM 33-2 are controlled based on the R/L (right/left) select signal CT, and the output data OUT, that is the computing result, is stored in either the left channel data RAM 33-1 or the right channel data RAM 33-2. The first selector 35-1 is connected to the output terminal of the left channel data RAM 33-1 and the output terminal of the right channel data RAM 33-2. The first selector 35-1 is a circuit to select one of the N (=2) variable data read from the left channel data RAM 33-1 and the right channel data RAM 33-2 respectively based on the R/L select signal CT. The first selector 35-1 has a gate circuit.

The second selector 35-2 is disposed to select (or accept) one of the N input data (e.g., two data; left channel input data L-ch IN and the right channel input data R-ch IN). The second selector 35-2 is a circuit to select one of the left channel input data L-ch IN and the right channel input data R-ch IN based on the R/L select signal CT, and has a gate circuit. The third selector 35-3 is connected to the output terminal of the second selector 35-2. The third selector 35-3 is a circuit to select either the output data of the second selector 35-2 or the output data OUT of the computing result based on the R/L select signal CT, and has a gate circuit.

The multiplier 36 is connected to the output terminal of the coefficient ROM 31 and the output terminal of the selector 35-1. The multiplier 36 is a circuit controlled by the control signal provided by the control unit 40 for multiplying the output data of the coefficient ROM 31 and the output data of the selector 35-1. The output terminal of the multiplier 36 is connected to the first input terminal of the ALU 37. The output terminal of the selector 35-3 is connected to the second input terminal of the ALU 37. The ALU 37 is a circuit controlled by the control signal provided by the control unit 40 for performing an arithmetic operation and a logic operation of the output data of the multiplier 36 and the output data of the selector 35-3. N registers (e.g., two registers: left channel register and right channel register) 38-1 and 38-2 are connected to the output terminal of the ALU 37.

The left channel register 38-1 and the right channel register 38-2 are circuits of which writing is controlled based on the R/L select signal CT. One of these registers 38-1 and 38-2 holds the output data of the ALU 37. The fourth selector 35-4 is connected to the output terminals of the registers 38-1 and 38-2. The fourth selector 35-4 is a circuit to select either the output data of the left channel register 38-1 or the output data of the right channel register 38-2 based on the R/L select signal CT so as to produce the output data OUT. The fourth selector 35-4 has a gate circuit. The output terminal of the fourth selector 35-4 is connected to the input terminal of the left channel data RAM 33-1, the input terminal of the right channel data RAM 33-2 and the input terminal of the selector 35-3.

The control unit 40 has a selector 41. The PC 42, the program memory (e.g., program ROM) 43 and the instruction decoder 44 are sequentially connected to the output terminal of the selector 41. The selector 41 is a circuit to select either the signals when the output of the PC 42 is incremented +1 or the control signals, such as a JUMP instruction, provided by the instruction decoder 44 according to one of the control signals provided by the instruction decoder 44. The PC 42 is a circuit to count based on the first clock CK, and to supply an address for reading an instruction to the program ROM 43. The program ROM 43 is a memory to store a program, including a plurality of instructions, and to read an instruction in the program specified by the address issued from the PC 42.

The instruction decoder 44 is a circuit to decode the instruction read from the program ROM 43 and to generate various control signals for executing an instruction (e.g., control signals of the coefficient ROM 31, control signals of the C pointer 32, control signals of the left channel data RAM 33-1 and right channel data RAM 33-2, control signals of the D pointer 34, output switching signals of the selectors 35-1-35-4, control signals of the multiplier 36, control signals of the ALU 37, control signals of the left channel register 38-1 and right channel register 38-2, control signals of the PC 42, control signals of the program ROM 43 and control signals of a JUMP instruction). The instruction decoder 44 also generates signals to determine whether the instruction is a data computing instruction. In other words, the instruction decoder 44 generates a data processing instruction signal DT that indicates that data computing and processing is being executed. The independent data control unit (e.g., R/L control unit) 50 is connected to the output terminal of the instruction decoder 44.

The R/L control unit 50 is a circuit to receive the data processing instruction signal DI and the second clock CLK, and to generate the common R/L select signal CT to be provided to the data control unit 30 and the first clock CK to be provided to the PC 42. The R/L control unit 50 includes the clock control circuit 51 and the select signal generation circuit (e.g., R/L register having a flag or register) 52. The clock control circuit 51 is a circuit to receive the data processing instruction signal DT, the second clock CLK and the R/L select signal CT supplied from the R/L register 52, and generate the first clock to be provided to the PC 42. The clock control circuit 51 has a gate circuit. The R/L register 52 is a circuit to receive the second clock CLK and the output signal of the clock control circuit 51, and to generate the R/L select signal with 1 or 0 logic, for example.

Other circuits of the control unit 40 include circuits related to instructions to support a loop instruction, but these are not included in the drawings and specification for the sake of simplification of description.

As understood from the above, when the data computing unit 30 in Embodiment 1 is compared with the data computing unit 10 in the conventional DSP 5 (FIG. 4(1)), all portions related to the data storage of the conventional data computing unit 10 can be selected for the right channel and left channel by only the common R/L select signal CT. Also, when the control unit 40 in Embodiment 1 is compared with the conventional control unit 20 (FIG. 4(2)), the control unit 40 is obtained by adding the R/L control unit 50 and other components to the conventional control unit 20.

To clarify the characteristics of the DSP 70 of Embodiment 1, the operation of the DSP 70 will be described in comparison with the operation of the conventional DSP 5 shown in FIGS. 4(1) and 4(2).

The DSP 70 of Embodiment 1 performs the following processings (1)-(3).

(1) The input data L-ch IN and R-ch IN are stored in the left channel data RAM 33-1 and right channel data RAM 33-2 respectively, (2) the data in the left channel data RAM 33-1 and right channel data RAM 33-2 and the coefficient data in the coefficient ROM 31 are multiplied and added, and (3) the computing result is issued.

Specifically the following calculation is performed:

$$C0 \times D0 + C1 \times D1 + C2 \times D2$$

The coefficient values C0-C2 are stored in the coefficient ROM 31. The variable values (data values) D0-D2 are stored in the left channel data RAM 33-1 and right channel data RAM 33-2.

If monaural data (not stereo data) is processed by the conventional DSP 5 shown in FIG. 4, this processing (cycle) becomes the following cycles 1-6.

Cycle 1: Input data IN is transferred to the register 18.

Cycle 2: Data is transferred from the register 18 to the data RAM 13.

Cycle 3: Data is transferred from the coefficient ROM 11 to the multiplier 15. At the same time, the data is transferred from the data RAM 13 to the multiplier 15. The output of the multiplier is stored in the register 18. Accordingly, the product of the coefficient data of the coefficient ROM 11 and the data of the data RAM 13 is stored in the register 18. The values of the C pointer 12 and the D pointer 14 are incremented +1. As a result, the value of the register 18 becomes C0×D0.

Cycle 4: Data is transferred from the coefficient ROM 11 to the multiplier 15. At the same time, the data is transferred from the data RAM 13 to the multiplier 15. The output of the register 18 added to the output of the multiplier 15 is stored in the register 18. At the same time, the values of the C pointer 12 and the D pointer 14 are incremented +1. As a result, the value of the register 18 becomes C0×D0+C1×D1.

Cycle 5: Data is transferred from the coefficient ROM 11 to the multiplier 15. At the same time, the data is transferred from the data RAM 13 to the multiplier 15. The output of the register 18 added to the output of the multiplier 15 is stored in the register 18. At the same time, the value of the C pointer 12 is decremented −2, and the value of the D pointer 14 is decremented −3. As a result, the value of the register 18 becomes C0×D0+C1×D1+C2×D2.

Cycle 6: The value of the register 18 is issued (output data OUT).

As described above, 6 cycles are required if monaural data is processed by the conventional DSP 5.

Cycles, when the same processing as the case of the above-described monaural data is performed on stereo data using the DSP 70 of Embodiment 1, will be described.

Figure 3:
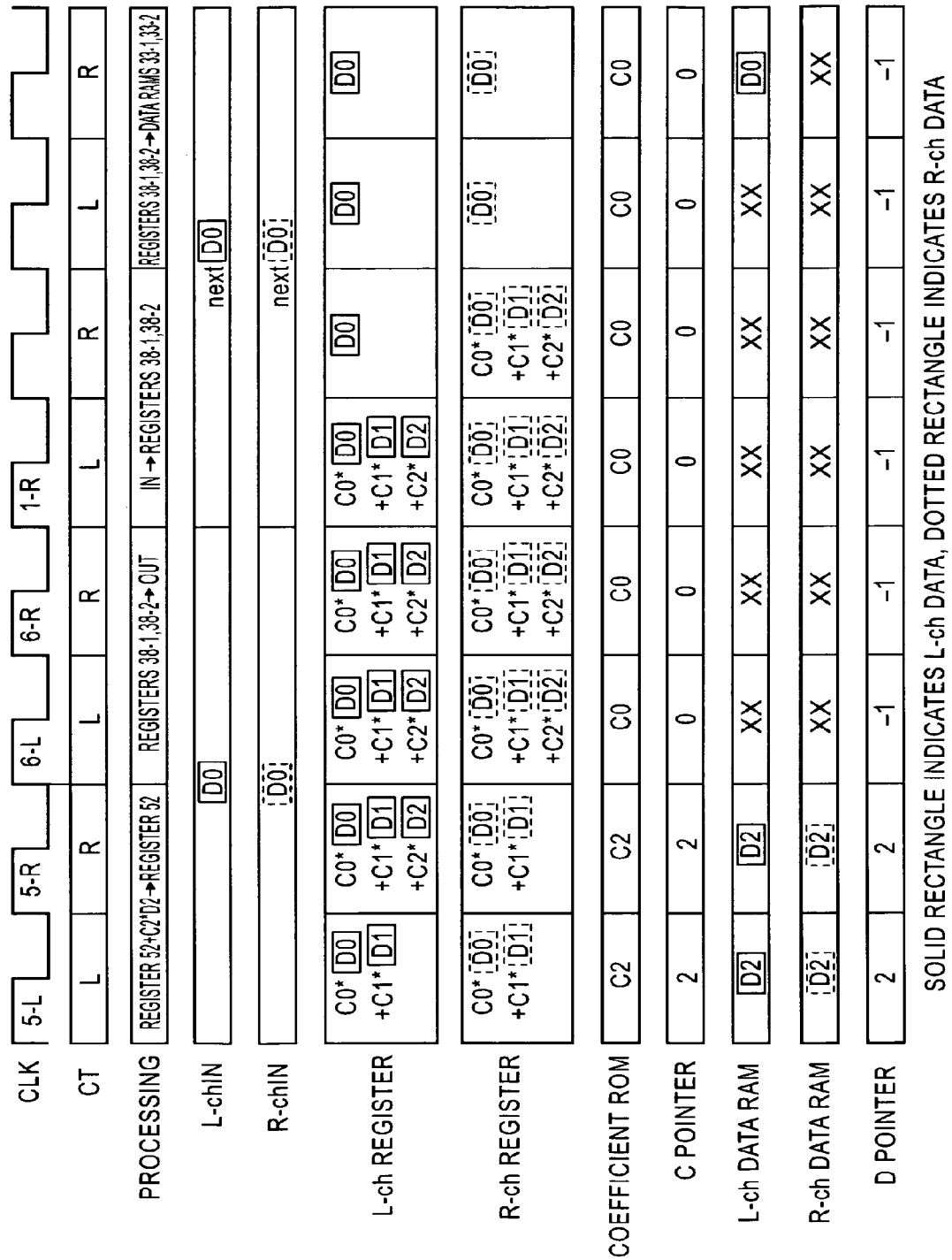
FIG. 3 is similar to FIG. 2 and depicts the change of values of the components of the DSP during a different time.

The diagrams shown in FIG. 2 and FIG. 3 depict in combination the change of the value of each component in the DSP 70.

In this example, a signal to distinguish the left channel L-ch from the right channel R-ch (R/L select signal CT) is generated from the control unit 40. The cycle to select the left channel is indicated by −L and the cycle to select the right channel is indicated by −R.

Cycle 1-L: Input data L-ch IN is transferred to the left channel register 38-1.

Cycle 1-R: Input data R-ch IN is transferred to the right channel register 38-2.

Cycle 2-L: Data is transferred from the left channel register 38-1 to the left channel data RAM 33-1.

Cycle 2-R: Data is transferred from the right channel register 38-2 to the right channel data RAM 33-2.

Cycle 3-L: Data is transferred from the coefficient ROM 31 to the multiplier 36. At the same time, data is transferred from the left channel data RAM 33-1 to the multiplier 36. The output of the multiplier 36 is stored in the left channel register 38-1.

Cycle 3-R: Data is transferred from the coefficient ROM 31 to the multiplier 36. At the same time, data is transferred from the right channel data RAM 33-2 to the multiplier 36. The output of the multiplier 36 is stored in the right channel register 38-2. At the same time, the values of the C pointer 32 and the D pointer 34 are incremented +1. Note that the pointers do not operate unless it is in a −R cycle.

As a result, the value of the left channel register 38-1 becomes C0×L-ch D0, and the value of the right channel register 38-2 becomes C0×R-ch D0.

Cycle 4-L: Data is transferred from the coefficient ROM 31 to the multiplier 36. At the same time, data is transferred from the left channel data RAM 31-1 to the multiplier 36. The output of the left channel register 38-1 added to the output of the multiplier 36 is stored in the left channel register 38-1.

Cycle 4-R: Data is transferred from the coefficient ROM 31 to the multiplier 36. At the same time, data is transferred from the right channel data RAM 33-2 to the multiplier 36. The output of the right channel register 38-2 added to the output of the multiplier 36 is stored in the right channel register 38-2. At the same time, the values of the C pointer 32 and the D pointer 34 are incremented +1. Note that the pointers do not operate unless it is in a −R cycle.

As a result, the value of the left channel register 38-1 becomes C0×L-ch D0+C1×L-ch D1, and the value of the right channel register 38-2 becomes C0×R-ch D0+C1×R-ch D1.

Cycle 5-L: Data is transferred from the coefficient ROM 31 to the multiplier 36. At the same time, data is transferred from the left channel data RAM 33-1 to the multiplier 36. The output of the left channel register 38-1 added to the output of the multiplier 36 is stored in the left channel register 38-1.

Cycle 5-R: Data is transferred from the coefficient ROM 31 to the multiplier 36. At the same time, data is transferred from the right channel data RAM 33-2 to the multiplier 36. The output of the right channel register 38-2 added to the output of the multiplier 36 is stored in the right channel register 38-2. At the same time, the value of the C pointer 32 is decremented −2, and the value of the D pointer 34 is decremented −3. Note that the pointers do not operate unless it is in a −R cycle. As a result, the value of the left channel register 38-1 becomes C0×L-ch D0+C1×L-ch D1+C2×L-ch D2, and the value of the right channel register 38-2 becomes C0×R-ch D0+C1×R-ch D1+C2×R-ch D2.

Cycle 6-L: The value of the left channel register 38-1 is issued (output data OUT).

Cycle 6-R: The value of the right channel register 38-2 is issued (output data OUT).

As described above using the examples, the right channel processing of stereo data by the DSP 70 of Embodiment 1 is the same as the conventional processing of monaural data. Therefore, the program developed for monaural data can be used as a program for the DSP 70. As is clear from the operation of the D pointer 34, the DSP 70 operates in the same manner when the D pointer 34 is processing the left channel data and when the D pointer 34 is processing the right channel data. Therefore, power consumption is not wasted.

In Embodiment 1, the R/L register 52 for distinguishing independent data is disposed in the control unit 40 in addition to the configuration of the conventional control unit 20, so as to supply the R/L select signal CT to indicate the independent data to the data computing unit 30. The instruction decoder 44 generates the data processing instruction signal DI for distinguishing a data processing instruction from other instructions, and the R/L register 52 is controlled by this signal DI. In the data computing unit 30, the portion related to storing independent data is multiplexed by the number of independent data to be processed, and this multiplexed portion is controlled by the R/L select signal CT, for indicating the independent data, from the control unit 40. Thus, an unnecessary pointer operation can be prevented, and the program developed for monaural can be directly applied to stereo data.

Embodiment 2

The present invention is not limited to the above described Embodiment 1, but can be modified in various ways. For example, when three or more independent data are used, the configuration of Embodiment 1 (FIG. 1(1) and FIG. 1(2)) may be modified as follows: the DSP may further include additional data RAM(s) 33-3, . . . , and additional register(s) 38-3 . . . . The selectors 35-1, 35-2 and 35-4 may be modified for a plurality of inputs and one output. The register 52 may be modified to generate a plurality of bits.

It should be noted that the DSP is described in the Embodiments, but the present invention can be applied to processing units with other configurations.

This application is based on a Japanese Patent Application No. 2004-122678 filed on Apr. 19, 2004, and the entire disclosure thereof is incorporated herein by reference.

What is claimed is:

1. A processing unit comprising:
   a first memory for storing common data to be used in common;
   a first pointer for indicating a first read position of the common data in the first memory;
   N second memories (N is a positive integer), in which the writing of a computing result is controlled based on a common select signal, for storing mutually independent data respectively;
   a second pointer for indicating a second read position of the independent data in the N second memories;
   a first selector for selecting one of the N independent data read from the N second memories based on the common select signal;
   a multiplexer for multiplying the common data read from the first memory and the independent data selected by the first selector, thereby providing a multiplication data;
   a second selector for selecting one of N input data based on the common select signal;
   a third selector for selecting either the input data selected by the second selector or the computing result based on the common select signal, thereby providing a selected data;
   an arithmetic and logic unit for performing an arithmetic operation and a logic operation of the multiplication data of the multiplexer and the selected data of the third selector, thereby providing N output data;
   N registers, of which holding of data is controlled based on the common select signal, for holding the N output data of the arithmetic and logic unit;
   a fourth selector for selecting one of the N output data of the N registers based on the common select signal, thereby providing the computing result;
   a program counter for counting based on a first clock and providing an address for reading an instruction;
   a program memory for storing a program, including a plurality of instructions, and for reading one of the plurality of instructions in the program specified by the address provided from the program counter;
   an instruction decoder for decoding the one instruction read by the program memory to generate a control signal for instruction execution, and for generating a data processing instruction signal that determines whether the instruction is a data computing instruction; and
   an independent data control unit for receiving the data processing instruction signal and second clock, for generating the common select signal based on the data processing instruction signal, for generating the first clock based on the second clock, and in response to the data processing instruction signal, for supplying the first clock to the program counter alter performing computing and processing cycles for the number of independent data if the one instruction is a data computing iiistruction, or providing the first clock immediately to the program counter if the one instruction is not the data computing instruction.

2. The processing unit according to claim 1, wherein the independent data control unit comprises:

a clock control circuit for receiving the data processing instruction signal and the second clock, and generating the first clock based on the data processing instruction signal; and a select signal generation circuit for receiving the second clock and the first clock generated by the clock control circuit, and generating the common select signal upon receiving the second clock.

3. The processing unit according to claim 2, wherein the select signal generation circuit has a flag or a register that is operated based on the second clock.

4. The processing unit according to claim 1, wherein the first read position indicated by the first pointer and the second read position indicated by the second pointer are enabled only at a last cycle of the computing and processing cycles for the number of the independent data by the control signal supplied from the instruction decoder.

5. The processing unit according to claim 1, wherein the first read position indicated by the first pointer and the second read position indicated by the second pointer are masked by the common select signal, and are enabled only at a last cycle of the computing and processing cycles for the number of independent data by the control signal supplied from the instruction decoder.

6. The processing unit according to claim 1, wherein the processing unit is a digital signal processor adapted to process a stereo-voice signal.

7. A data computing module comprising:

a first memory for storing common data to be used in common;

a first pointer for indicating a first read position of the common data in the first memory;

N second memories (N is a positive integer), in which the writing of a computing result is controlled based on a common select signal, for storing mutually independent data respectively;

a second pointer for indicating a second read position of the independent data in the N second memories;

a first selector for selecting one of the N independent data read from the N second memories based on the common select signal;

a multiplexer for multiplying the common data read from the first memory and the independent data selected by the first selector, thereby providing a multiplication data;

a second selector for selecting one of N input data based on the common select signal, the N input date being given from outside the data computing module;

a third selector for selecting either the input data selected by the second selector or the computing result based on the common select signal, thereby providing a selected data;

an arithmetic and logic unit for performing an arithmetic operation and a logic operation of the multiplication data of the multiplexer and the selected data of the third selector, thereby providing N output data;

N registers, of which holding of data is controlled based on the common select signal, for holding the N output data of the arithmetic and logic unit; and a fourth selector for selecting one of the N output data of the N registers based on the common select signal, thereby providing the computing result;

wherein the first read position indicated by the first pointer and the second read position indicated by the second nointer are enabled only at a last cycle of the computing and processing cycles for the number of the indenendent data by the control signal supplied from the instruction decoder.

8. The data computing module according to claim 7, wherein the data computing module processes a stereo-voice signal.

9. A data computing module comprising:

a first memory for storing common data to be used in common;

a first pointer for indicatins a first read position of the common data in the first memory;

N second memories (N is a positive integer), in which the writing of a computing result is controlled based on a common select signal, for storing mutually independent data respectively;

a second pointer for indicating a second read position of the independent data in the N second memories;

a first selector for selecting one of the N independent data read from the N second memories based on the common select signal;

a multiplexer for multiplying the common data read from the first memory and the independent data selected by the first selector, thereby providing a multiplication data;

a second selector for selecting one of N input data based on the common select signal, the N input date being given from outside the data computing module;

a third selector for selecting either the input data selected by the second selector or the computing result based on the common select signal, thereby providing a selected data;

an arithmetic and logic unit for performing an arithmetic operation and a logic operation of the multiplication data of the multiplexer and the selected data of the third selector, thereby providing N output data;

N registers, of which holding of data is controlled based on the common select signal, for holding the N output data of the arithmetic and logic unit; and a fourth selector for selecting one of the N output data of the N registers based on the common select signal, thereby providing the computing result;

wherein the first read position indicated by the first pointer and the second read position indicated by the second pointer are masked by the common select signal, and are enabled only at a last cycle of the computing and processing cycles for the number of independent data by the control signal supplied from the instruction decoder.

10. A controller module for use with a data computing module, the data computing module comprising:

a first memory for storing common data to be used in common;

a first pointer for indicating a first read position of the common data in the first memory;

N second memories (N is a positive integer), in which the writing of a computing result is controlled based on a common select signal, for storing mutually independent data respectively;

a second inter for indicating a second read position of the independent data in the N second memories;

a first selector for selecting one of the N independent data read from the N second memories based on the common select signal;

a multiplexer for multiplying the common data read from the first memory and the independent data selected by the first selector, thereby providing a multiplication data;

a second selector for selecting one of N input data based on the common select signal, the N input date being given from outside the data computing module;

a third selector for selecting either the input data selected by the second selector or the computing result based on the common select signal, thereby providing a selected data;

an arithmetic and logic unit for performing an arithmetic operation and a logic operation of the multiplication data of the multiplexer and the selected data of the third selector, thereby providing N output data;

N registers, of which holding of data is controlled based on the common select signal, for holding the N output data of the arithmetic and logic unit; and a fourth selector for selecting one of the N output data of the N registers based on the common select signal, thereby providing the computing result;

the controller module comprising:

a program counter for counting based on a first clock and providing an address for reading an instruction;

a program memory for storing a program, including a plurality of instructions, and for reading one of the plurality of instructions in the program specified by the address provided from the program counter;

an instruction decoder for decoding the one instruction read by the program memory to generate a control signal for instruction execution, and for generating a data processing instruction signal that determines whether the instruction is a data computing instruction; and an independent data control unit for receiving the data processing instruction signal and second clock, for generating a common select signal based on the data processing instruction signal, for generating the first clock based on the second clock, and in response to the data processing instruction signal, for supplying the first clock to the program counter after performing computing and processing cycles for the number of independent data if the one instruction is a data computing instruction, or providing the first clock immediately to the program counter if the one instruction is not the data computing instruction.

11. The controller module according to claim 10, wherein the independent data control unit comprises:

a clock control circuit for receiving the data processing instruction signal and the second clock, and generating the first clock based on the data processing instruction signal; and a select signal generation circuit for receiving the second clock and the first clock generated by the clock control circuit, and generating the common select signal upon receiving the second clock.

12. The controller module according to claim 11, wherein the select signal generation circuit has a flag or a register that is operated based on the second clock.

13. The controller module according to claim 10, wherein the first read position indicated by the first pointer and the second read position indicated by the second pointer of the data computing module are enabled only at a last cycle of the computing and processing cycles for the number of the independent data by the control signal supplied from the instruction decoder.

14. The controller module according to claim 10, wherein the first read position indicated by the first pointer and the second read position indicated by the second pointer are masked by the common select signal, and are enabled only at a last cycle of the computing and processing cycles for the number of independent data by the control signal supplied from the instruction decoder.

15. The controller module according to claim 10, wherein the controller module processes a stereo-voice signal.

* * * * *